Figure 7:
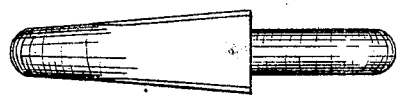

2 Sheets--Sheet 1.
EDWARD H. DUNN.
Improvement in Saddle Trees.
No. 121,282.  Patented Nov 28, 1871.
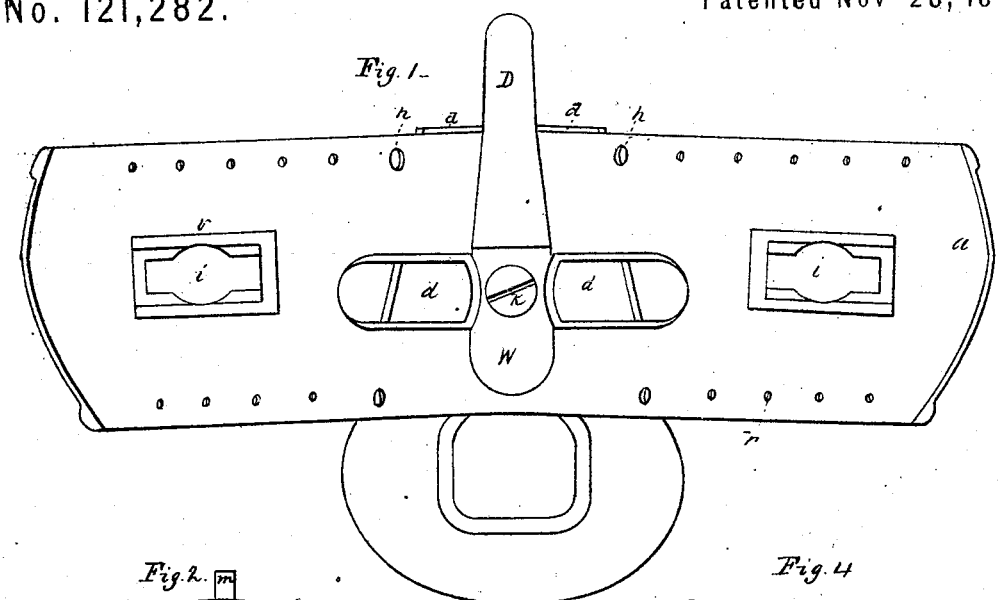
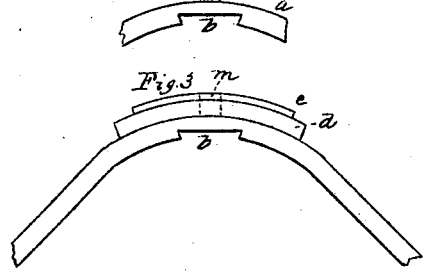
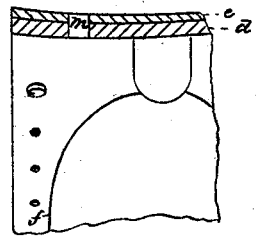
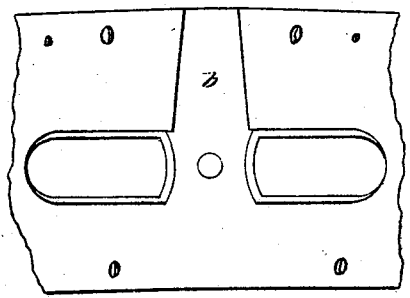
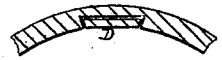
Witnesses:
Geo. E. Budd
D. W. Scribner
Inventor.
Edward H. Dunn
Per Wm. H. Clifford, atty.
AM. PHOTO-LITHOGRAPHIC CO. N.Y. (OSBORNE'S PROCESS.)

2 Sheets--Sheet 2.

EDWARD H. DUNN.

Improvement in Saddle Trees.

No. 121,282.

Patented Nov. 28, 1871.

Witnesses:
George E. Bird
J. A. Briggs

Inventor:
Edward H. Dunn
Per Wm H Clifford att'y

UNITED STATES PATENT OFFICE.

EDWARD H. DUNN, OF PORTLAND, MAINE.

IMPROVEMENT IN SADDLE-TREES.

Specification forming part of Letters Patent No. 121,282, dated November 28, 1871.

*To all whom it may concern:*

Be it known that I, EDWARD H. DUNN, of the city of Portland, in the county of Cumberland and State of Maine, have invented new and useful Improvements in Saddle-Trees for Harness-Saddles; and I hereby declare the following to be a full, clear, and exact description thereof, reference being had to the accompanying drawing, in which—

Figure 1 is a view of the under or lower side of the tree. Fig. 2 is a front-edge view of the tree, showing the slot $b$ and stud $m$. Fig. 3 shows the front edge of the tree, the slot $b$, the seat $e$, and leather pad $d$. Fig. 4 is a side elevation of part of the tree, showing the stud $m$ and the seat $e$ and pad $d$ in section. Fig. 5 shows part of the under side of the tree and the flaring shape of the slot to receive the water-hook. Fig. 6 is a sectional detail, showing the dovetailed shape of the slot and that part of the water-hook that fits therein; and Fig. 7 shows the under side of the water-hook.

My invention has reference to certain improvements in the saddle-trees of harness-saddles. Hitherto the water-hook and terrets have been attached to the saddle-tree by nuts applied to their bolts on the under side of the tree. When secured in this manner the water-hook is very liable to become loose from the strain brought upon it by the check-rein, while the nuts by which both water-hook and terrets are held in place must be deeply padded, and not always successfully, to prevent them from chafing the back of the animal. To remedy the defect of this mode of attachment is the purpose of my invention, of which the following shows the construction.

At the point where the water-hook is now bolted to the under surface of the tree is cut a dovetailed slot, $b$, at the same time having a wedged shape and flaring toward the rear of the tree. (See Fig. 5.) The length of the slot is about one-third of the width of the tree. To this slot the shank of the water-hook D conforms in shape, as seen in Fig. 7. Into this slot the shank of the water-hook is inserted, and is secured in it by the key W, which is held in place by the screw K. The shank of the water-hook having equal thickness with the depth of the slot $b$, it is obvious that there is no inequality or projection occasioned by the insertion of the water-hook, but that it leaves a concave surface essentially smooth and regular. In the under surface of the tree are two rectangular depressions, one on each side of the water-hook, through which are made the apertures $i$ to receive the bolts of the terrets, which are secured by nuts fitting the depressions and having a thickness equal to the depth of the same, so that the surface of the tree is broken by no projection.

Another great advantage arising from the above-described method of inserting the water-hook is that all strain brought to bear upon it by the check-rein tends not to weaken or loosen it, but rather to fix it more firmly in place in consequence of the wedged or flaring shape of the slot. Projecting from and forming part of the saddle-tree is the stud $m$. (See Fig. 2.) This stud, projecting from the upper part of the saddle-tree, passes through the pad $d$ and seat $e$, which, being also secured by the screw $k$, are thus held very firmly in place.

The great advantages of this method of attaching the water-hook and terrets arise from the strength and firmness with which the water-hook is retained in place and the impossibility of its working loose, and also in the smooth and uniform surface thus given to the under side of the saddle-tree.

I am aware of Letters Patent No. 92,717, granted to G. D. Gillett July 20, 1869, and do not claim such a device as his, either in the construction or application of the parts. I would also disclaim the devices shown in the Letters Patent of Philip H. Wiedersum, No. 111,502, and Emery E. Hardy, No. 104,023, it being the object of my invention to secure the water-hook and terrets to the saddle-tree in such a manner that the under side of the tree will present a smooth and unbroken surface.

What I claim as my invention, and desire to secure by Letters Patent, is—

The method of attaching the water-hook, having the shank, as described, to the saddle-tree by means of the slot $b$, key W, and screw K, substantially as and for the purposes set forth.

EDWARD H. DUNN.

Witnesses:
 WM. HENRY CLIFFORD,
 GEORGE E. BIRD.

(72)